US007767348B2

(12) United States Patent
Nagayama et al.

(10) Patent No.: US 7,767,348 B2
(45) Date of Patent: Aug. 3, 2010

(54) NON-AQUEOUS ELECTROLYTE SECONDARY BATTERY AND BATTERY PACK USING THE SAME

(75) Inventors: Masatoshi Nagayama, Osaka (JP); Takuya Nakashima, Osaka (JP); Yoshiyuki Muraoka, Osaka (JP)

(73) Assignee: Panasonic Corporation, Osaka (JP)

( * ) Notice: Subject to any disclaimer, the term of this patent is extended or adjusted under 35 U.S.C. 154(b) by 1043 days.

(21) Appl. No.: 11/492,129

(22) Filed: Jul. 25, 2006

(65) Prior Publication Data

US 2007/0048615 A1 Mar. 1, 2007

(30) Foreign Application Priority Data

Aug. 25, 2005 (JP) ............................. 2005-243861

(51) Int. Cl.
*H01M 2/18* (2006.01)
*H01M 2/16* (2006.01)
*H01M 4/02* (2006.01)

(52) U.S. Cl. ........................................ 429/246; 429/94

(58) Field of Classification Search ....................... None
See application file for complete search history.

(56) References Cited

U.S. PATENT DOCUMENTS 3,732,124 A * 5/1973 Cailley ........................ 429/94
4,053,687 A * 10/1977 Coibion et al. ................ 429/94
4,154,908 A * 5/1979 Menard ...................... 429/206
6,040,086 A * 3/2000 Yoshida et al. .............. 429/211
6,152,971 A 11/2000 Miyanowaki et al.
6,423,447 B1 * 7/2002 Ohsaki et al. ............... 429/217
6,447,958 B1 * 9/2002 Shinohara et al. ........... 429/248
6,730,434 B1 * 5/2004 Kawakami et al. ....... 429/218.1
2002/0172862 A1 * 11/2002 Tamura et al. ........... 429/218.1
2002/0197535 A1 * 12/2002 Dudley et al. ............... 429/246
2003/0087155 A1 * 5/2003 Cho et al. .............. 429/231.95
2003/0186095 A1 * 10/2003 Okutani et al. ................ 429/18
2005/0175901 A1 * 8/2005 Kawakami et al. ..... 429/231.95
2006/0006063 A1 * 1/2006 Tanaka et al. ............... 204/280
2006/0051663 A1 * 3/2006 Fujita et al. ................. 429/142
2006/0251965 A1 * 11/2006 Nagayama et al. .......... 429/209

FOREIGN PATENT DOCUMENTS

JP 10-144301 5/1998
JP 11-354110 12/1999
JP 2003-208890 A 7/2003

* cited by examiner

*Primary Examiner*—Robert Hodge
(74) *Attorney, Agent, or Firm*—McDermott Will & Emery LLP

(57) ABSTRACT

A non-aqueous electrolyte secondary battery includes an electrode assembly formed by winding positive and negative electrodes, and an insulating layer together. Each of the electrodes has a core sheet and mixture layers formed on both sides of the sheet. The insulating layer electrically insulates the electrodes. At least one of the electrodes includes a core-exposed portion continuous parallel to the winding direction. Each of the mixture layers has an inclined weight region where the amount of mixture per unit area decreases toward the core-exposed portion, and a constant weight region in which the amount of mixture per unit area is constant. The inclined weight region has a width of not more than 0.2 of the width of the mixture layers and has an average mixture density of not less than 40% and not more than 99% of the mixture density of the constant weight region.

15 Claims, 2 Drawing Sheets

NON-AQUEOUS ELECTROLYTE SECONDARY BATTERY AND BATTERY PACK USING THE SAME

BACKGROUND OF THE INVENTION

1. Field of the Invention

The present invention relates to a non-aqueous electrolyte secondary battery for high output use, and more particularly, to an inexpensive and safe non-aqueous electrolyte secondary battery and a battery pack using the battery.

2. Background Art

Non-aqueous electrolyte secondary batteries such as lithium ion secondary batteries have a higher energy density than other storage batteries. Because of this advantage, non-aqueous electrolyte secondary batteries are expanding their market from consumer use such as portable appliances to power tool use such as electric tools.

In hybrid electric vehicle use, for example, if only a large amount of current can be quickly taken out of a non-aqueous electrolyte secondary battery when the vehicle is started or accelerated, the vehicle can be driven afterwards by the internal combustion engine. On the other hand, in electric tool use where the non-aqueous electrolyte secondary battery is the only power source, a large load is required to start the motor. Particularly when the motor is started from the condition in which the tool is in contact with the operating object, the battery is required to produce a larger output.

These operating circumstances require high-output secondary batteries to improve their output characteristics, for which a reduction in internal resistance is inevitable. The reduction in internal resistance is greatly affected by the current collecting structure in the electrodes (the positive electrode and the negative electrode). More specifically, the internal resistance can be reduced by attaching a current collector collectively to the wound parts of an exposed portion having no mixture applied thereon of each core sheet of the electrodes. This technique is already in practical use in nickel-cadmium batteries and nickel-hydrogen batteries in electric tool and hybrid electric vehicle uses. In these batteries, the core sheets are at least as large as 300 μm in thickness, making it possible to attach a current corrector collectively to the wound parts of an exposed portion at an end of each electrode.

In non-aqueous electrolyte secondary batteries, on the other hand, the core sheets only have a thickness of several tens of micrometers. Therefore, the core sheets need to have a core-exposed portion at their ends so that a current collector can be attached collectively to the wound parts of the core-exposed portion. As methods for forming the core-exposed portion, there have been various suggestions. For example, Japanese Patent Unexamined Publication No. H10-144301 suggests removing part of the mixture layers formed on each electrode. Japanese Patent Unexamined Publication No. H11-354110 suggests protecting an area that is to be the core-exposed portion with a tape and then removing the tape after the area is coated with mixture layers.

In these methods, however, the process of removing the mixture layers degrades the productivity, and the use of the masking material, which is an expendable supply, not only requires the applying and removing processes, but also boosts the cost.

Japanese Patent Unexamined Publication No. 2003-20890, on the other hand, suggests forming the mixture layers excluding the end portions of the electrodes so as to make the core-exposed portions at the end portions. In this case, the mixture is applied in such a manner as to swell on the boundary between the core-exposed portion and the mixture layer, and the thickness of the mixture layer is smoothed in a later rolling process.

The formation of the electrodes in this manner causes a problem according to safety. More specifically, the application of the mixture in such a manner as to swell on the boundary between the core-exposed portion and the mixture layer of the positive electrode increases the weight of the positive electrode on the boundary. This causes the negative electrode to have a load exceeding the load design value at the portion opposing the boundary on the positive electrode. As a result, lithium ions that cannot be stored in the negative electrode may deposit as metallic lithium on the surface of the negative electrode. It is known that an increase in the amount of lithium ions to be stored in the negative electrode leads to a decrease in the thermal stability of the negative electrode. That is why the load design of the negative electrode is very important. Especially, high-output secondary batteries are required to be large in size for the purpose of improving output characteristics. The increased output and size causes an increase in the internal energy and a decrease in the thermal stability of the non-aqueous electrolyte secondary batteries. Therefore, the electrode design is very important to the batteries.

SUMMARY OF THE INVENTION

The present invention aims to provide a safe and productive non-aqueous electrolyte secondary battery having excellent discharge characteristic as a power supply for high output use, and a battery pack using the battery.

The non-aqueous electrolyte secondary battery of the present invention includes an electrode assembly formed by winding a positive electrode, a negative electrode, and insulating layers together. The positive and negative electrodes each have a core sheet and mixture layers formed on both sides of the core sheet. The insulating layers electrically insulate the positive and negative electrodes. At least one of the positive and negative electrodes includes a core-exposed portion continuous parallel to the winding direction. The mixture layers each have an inclined weight region and a constant weight region. In the inclined weight region, the amount of mixture per unit area decreases in parallel with and toward the core-exposed portion. In the constant weight region which is adjacent to the inclined weight region, the amount of mixture per unit area is constant. The inclined weight region has a width of not more than 0.2 of the width of the mixture layers and has an average mixture density of not less than 40% and not more than 99% of the mixture density of the constant weight region.

As described above, when the core-exposed portion is formed at least one of the positive and negative electrodes, the weight of the mixture is inclined in the inclined weight region of the mixture layer. This structure can eliminate the process of removing the mixture layers and reducing the number of expendable supplies, thereby enabling the battery to be manufactured at low cost. The battery also has high safety by reducing the weight of the positive electrode on the end of the mixture-coated surface so as to reduce the design load of the opposing negative electrode. The battery configuration of the present invention makes the non-aqueous electrolyte secondary battery highly productive and safety.

DETAILED DESCRIPTION OF THE INVENTION

Figure 1A:
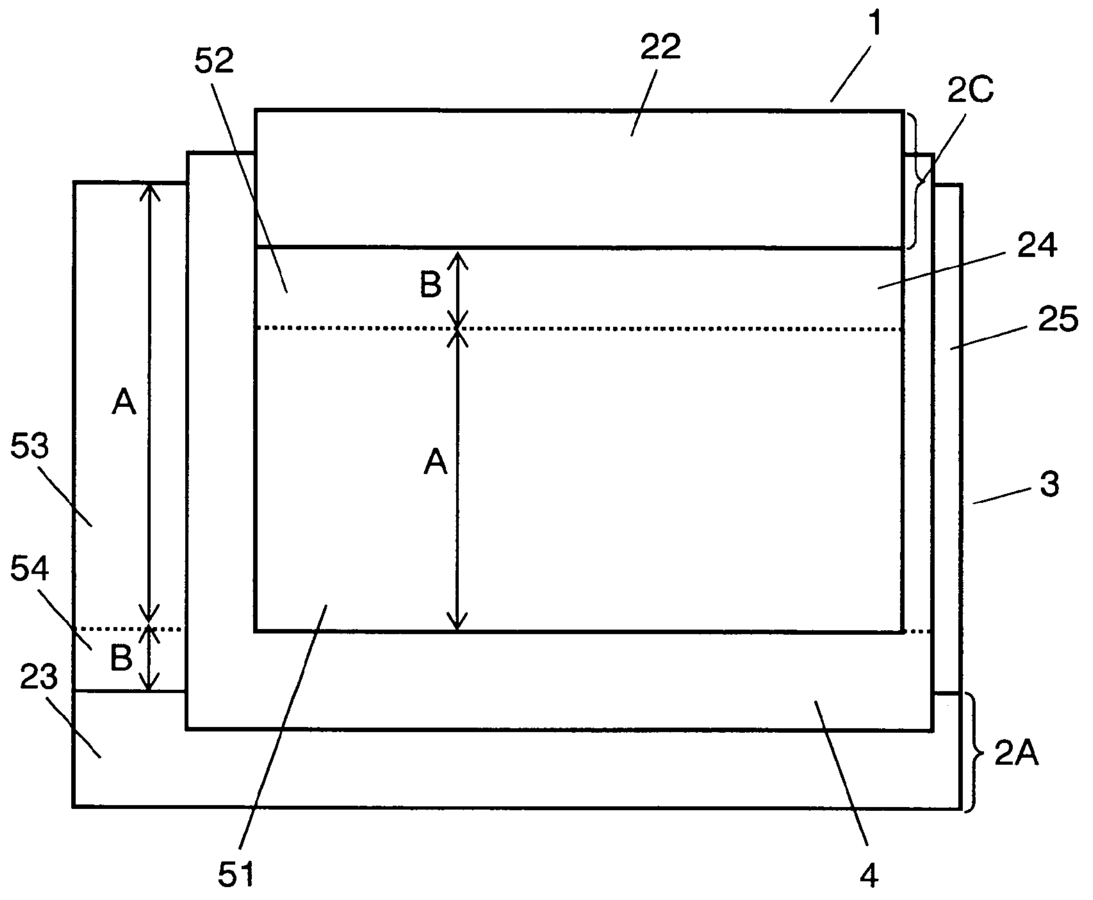
FIG. 1A is a developed schematic view showing a positive electrode, a negative electrode, and a separator of a non-aqueous electrolyte secondary battery in accordance with an embodiment of the present invention.
Figure 1B:
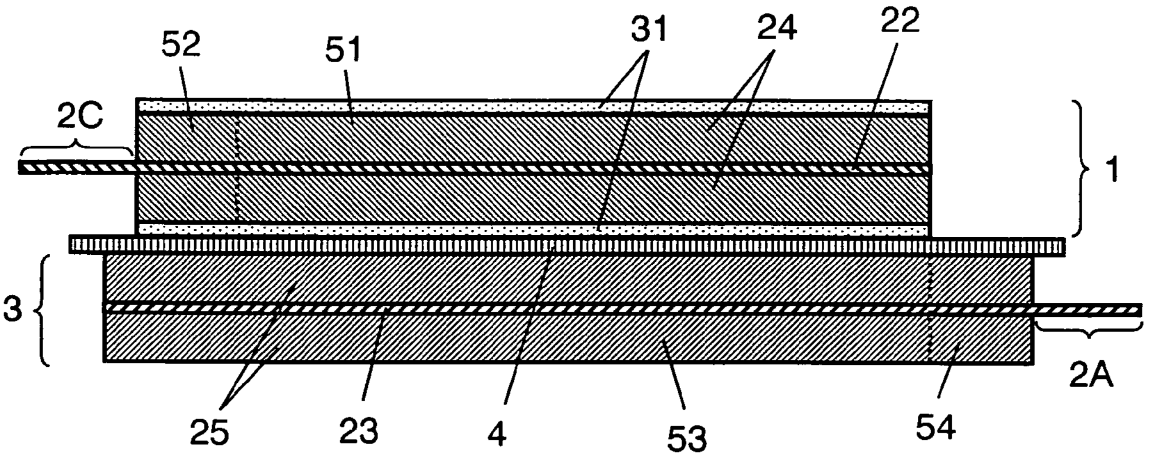
FIG. 1B is a sectional view of an essential part of the non-aqueous electrolyte secondary battery in accordance with the embodiment of the present invention.
Figure 2A:
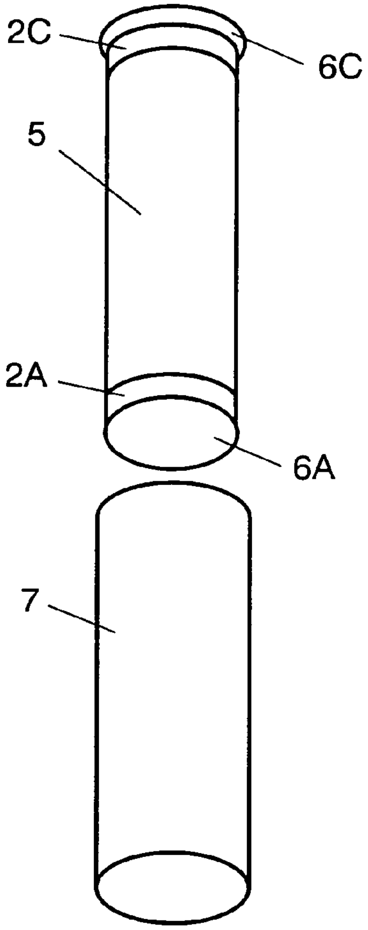
FIG. 2A is a schematic view of the non-aqueous electrolyte secondary battery in accordance with the embodiment of the present invention.

FIG. 1A is a developed schematic view showing a positive electrode, a negative electrode, and a separator of a non-aqueous electrolyte secondary battery in accordance with an embodiment of the present invention. FIG. 1B is a sectional view of an essential part of the non-aqueous electrolyte secondary battery in accordance with the embodiment of the present invention. FIG. 2A is a schematic view of the non-aqueous electrolyte secondary battery in accordance with the embodiment of the present invention.

Electrode assembly 5 shown in FIG. 2A is formed by winding positive electrode 1 and negative electrode 3 shown in FIG. 1A together with separator 4 therebetween. As shown in FIG. 1B, positive electrode 1 includes positive electrode core sheet 22 and positive-electrode mixture layers 24 formed on both sides of positive electrode core sheet 22. Positive-electrode mixture layers 24 each have insulating layer 31 on their surface. Negative electrode 3 includes negative electrode core sheet 23 and negative-electrode mixture layers 25 formed on both sides of negative electrode core sheet 23. Positive and negative electrodes 1 and 3 include core-exposed portions 2C and 2A, respectively, which are continuous parallel to the winding direction.

As shown in FIG. 2A, after electrode assembly 5 is complete, current collector 6C is attached to core-exposed portion 2C, and current collector 6A is attached to core-exposed portion 2A. In this case, current collector 6C is collectively welded to the wound parts of core-exposed portion 2C, and current collector 6A is collectively welded to the wound parts of core-exposed portion 2A. Later, electrode assembly 5 is housed in battery can 7; current collector 6A is connected to battery can 7; and current collector 6C is connected to an unillustrated lid. Finally, battery can 7 is filled with an unillustrated non-aqueous electrolytic solution and closed by being crimped together with the lid so as to complete a non-aqueous electrolyte secondary battery.

Figure 2B:
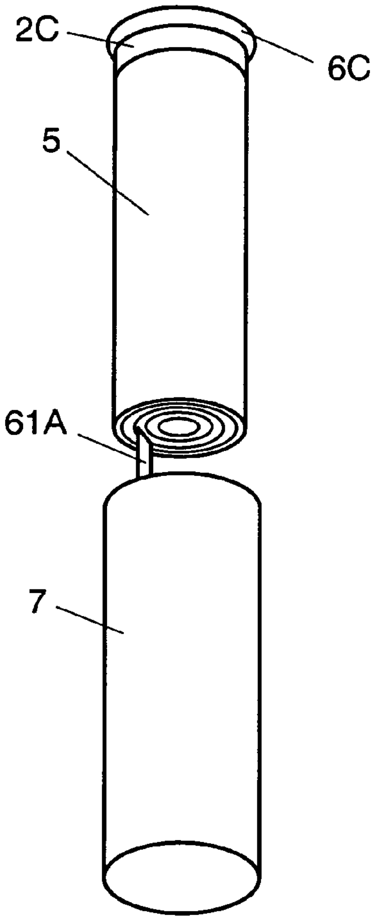
FIG. 2B is a schematic view of another non-aqueous electrolyte secondary battery in accordance with the embodiment of the present invention.

The core-exposed portion may be formed only on positive electrode 1 and not on negative electrode 3 as shown in FIG. 2B. In this case, negative-electrode mixture layers 25 are partly removed in the direction perpendicular to the winding direction, and the removed portion is welded with current collector 61A. Although not illustrated, it is also possible to form the core-exposed portion only on negative electrode 3 and not on positive electrode 1.

The positive active material to be contained in positive-electrode mixture layers 24 can be any known positive electrode material containing a sufficient amount of lithium ions and capable of storing and emitting lithium ions. Desirable examples of the positive active material include compound metal oxides composed of lithium and a transition metal which are expressed by a general formula: $LiM_xO_y$ and lithium-containing intercalation compounds. In the general formula, $1<x\leqq2$; $2<y\leqq4$; and M contains at least one of cobalt (Co), nickel (Ni), manganese (Mn), iron (Fe), aluminum (Al), vanadium (V), and titanium (Ti).

The binder to be contained in positive-electrode mixture layers 24 may be any known binder commonly used in the positive-electrode mixture layers of batteries of this kind. Specific examples of the binder include: polyethylene, polypropylene, polytetrafluoroethylene (PTFE), polyvinylidene fluoride (PVDF), and styrene-butadiene rubber. Positive-electrode mixture layers 24 may be added with a known additive agent or other agents when necessary. More specifically, a conductive agent such as carbon black may be added.

Positive electrode core sheet 22 and current collector 6C can be made of aluminum (Al), titanium, or the like, and either positive electrode core sheet 22 or current collector 6C may be used after being surface-treated with carbon or the like. The carbon surface treatment is applied excluding core-exposed portion 2C.

The negative active material to be contained in negative-electrode mixture layers 25 can be a carbon material, a crystalline or amorphous metal compound, or the like which are capable of storing and emitting lithium ions. Specific examples of the carbon material include non-graphitizable carbon materials such as cokes and glassy carbons, highly crystalline carbon materials with a well-developed crystal structure, such as graphite materials. More specific examples of the carbon material include pyrolytic carbons, cokes (pitch cokes, needle cokes, petroleum cokes, and the like), graphites, glassy carbons, the fired materials of organic polymer compounds (materials obtained by carbonizing phenolic resin, furan resin, or the like by being fired at appropriate temperatures), carbon fibers, and activated carbons.

The binder to be contained in negative-electrode mixture layers 25 can be polyethylene, polypropylene, PTFE, PVDF, or styrene-butadiene rubber. The binder may be any known binder commonly used in the negative-electrode mixture layers of batteries of this kind. Negative-electrode mixture layers 25 may be added with a known additive agent or other agents when necessary.

Negative electrode core sheet 23 and current collector 6A can be made of stainless steel, nickel, copper, titanium, or the like. Either negative electrode core sheet 23 or current collector 6A may be used after being surface-treated with carbon, nickel, titanium, or the like. The carbon surface treatment is applied excluding core-exposed portion 2A.

The non-aqueous electrolytic solution is prepared by dissolving an electrolyte (supporting electrolyte) in a non-aqueous solvent. The non-aqueous solvent contains, as the main solvent, ethylene carbonate (hereinafter, EC), which has a comparatively high dielectric constant and is hard to be degraded by the graphite contained in negative electrode 3. The use of EC as the main solvent is particularly desirable when the negative active material contains a graphite material. However, it is alternatively possible to use a compound in which hydrogen atoms of EC are replaced by halogen.

Part of EC or the compound in which the hydrogen atoms of EC are replaced by halogen as the main solvent can be replaced by a second component solvent to obtain better properties. The second component solvent can be something that reacts with a graphite material such as propylene carbonate (hereinafter, PC). Specific examples of the second component solvent other than PC include: butylene carbonate, vinylene carbonate, 1,2-dimethoxyethane, 1,2-dimethoxymethane, γ-butyrolactone, valerolactone, tetrahydrofuran, 2-methyltetrahydrofuran, 1,3-dioxolane, 4-methyl-1,3-dioxolane, sulfolane, and methylsulfolane.

The non-aqueous solvent is preferably used with a low viscosity solvent to increase conductivity, thereby improving current characteristics and also to reduce reactivity with metallic lithium, thereby improving safety. Specific examples of the low viscosity solvent include: symmetric or asymmetric chain carbonic esters such as diethyl carbonate, dimethyl carbonate, methyl ethyl carbonate, and methyl propyl carbonate; symmetric or asymmetric chain carbonic carboxylic esters such as methyl propionate and ethyl propionate; and phosphate esters such as trimethyl phosphate and triethyl phosphate. These low viscosity solvents can be used either on their own or in combination.

The electrolyte can be any lithium salt that is dissolved in a non-aqueous solvent and is ion conductive. Specific examples of the electrolyte include: $LiPF_6$, $LiClO_4$, $LiAsF_6$, $LiBF_4$, $LiB(C_6H_5)_4$, $LiCH_3SO_3$, $CF_3SO_3Li$, LiCl, LiBr, and the like. Of these, $LiPF_6$ is most desirable. These electrolytes can be used either on their own or in combination.

The electrolyte of the non-aqueous electrolyte battery is not limited to the aforementioned non-aqueous electrolytic solution and can be a solid or gel electrolyte. The non-aqueous electrolyte battery, which is cylindrical in the present embodiment, can be formed in other shapes such as a rectangular column or a plate and can be thin, large, or any other size.

Separator 4 can be a microporous membrane made of polyolefin such as polyethylene or polypropylene.

Battery can 7 can be made of iron, nickel, stainless steel, aluminum, titanium, or the like and may be subjected to plating or other treatments to avoid electrochemical corrosion caused by the non-aqueous electrolytic solution during charge-discharge cycles.

Insulating layers 31 are porous layers which are made of an insulating material and can permeate a non-aqueous electrolytic solution. In other words, insulating layers 31 are permeable to lithium ion. The inorganic filler to be contained in insulating layers 31 is made of aluminum oxide (alumina), silicon dioxide, titanium dioxide, zirconium oxide, magnesium oxide, or resin all of which being in powder form. These materials can be used either on their own or in combination. The inorganic filler is not limited in shape.

Insulating layers 31 prevent a short circuit between positive electrode 1 and negative electrode 3 like separator 4, and therefore separator 4 is not necessary in some battery configurations. Insulating layers 31 formed on positive-electrode mixture layers 24 in the present embodiment may be alternatively formed on negative-electrode mixture layers 25, on both layers 24 and 25, or on separator 4.

However, it is still desirable to provide separator 4 because when the battery reaches an abnormally high temperature, separator 4 is melted to close its pores so as to block the flow of current, thereby improving the safety of the battery. In order to weld current collectors 6A and 6C to core-exposed portions 2A and 2C, respectively, both ends of separator 4 are required to be at least inside the ends of core-exposed portions 2A and 2C.

The following is a description of weight distribution on positive-electrode mixture layers 24 and on negative-electrode mixture layers 25 in the present embodiment. Positive-electrode mixture layers 24 will be described first.

Each of positive-electrode mixture layers 24 has constant weight region 51 and inclined weight region 52. Inclined weight region 52 is formed to be adjacent to and substantially parallel to core-exposed portion 2C. Inclined weight region 52 has a less amount of mixture per unit area as it is closer to core-exposed portion 2C. In other words, in inclined weight region 52, the amount of mixture per unit area in parallel with core-exposed portion 2C decreases toward core-exposed portion 2C.

Constant weight region 51 is adjacent to inclined weight region 52 and is substantially constant in the amount of mixture per unit area. Assuming that constant weight region 51 has a width "A", and inclined weight region 52 has a width "B", the relation "$0<B/(A+B)\leqq 0.2$" is satisfied.

Inclined weight region 52 has an average mixture density of not less than 40% and not more than 99% of the mixture density of constant weight region 51, and the average mixture density is controlled by roll-pressing positive-electrode mixture layers 24. When the width "B" of inclined weight region 52 exceeds 0.2 of the width (A+B) of positive-electrode mixture layer 24, the battery capacity decreases. On the other hand, when the ratio of the average mixture density of inclined weight region 52 to the mixture density of constant weight region 51 is less than 40%, positive electrode core sheet 22 and positive-electrode mixture layers 24 have an insufficient bonding strength therebetween after the roll-pressing of positive-electrode mixture layers 24. As a result, the mixture is highly likely to fall off positive electrode core sheet 22 if subjected to an impact or vibration. To avoid this, inclined weight region 52 has an average mixture density of not less than 40% and not more than 99% of the mixture density of constant weight region 51.

Similarly, each of negative-electrode mixture layers 25 has constant weight region 53 and inclined weight region 54. Assuming that constant weight region 53 has a width "A" and inclined weight region 54 has a width "B", the relation "$0<B/(A+B)\leqq 0.2$" is satisfied. Inclined weight region 54 has an average mixture density of not less than 40% and not more than 99% of the mixture density of constant weight region 53. The constant weight region and the inclined weight region, which are formed in both positive-electrode mixture layers 24 and negative-electrode mixture layers 25 in the present embodiment, may be formed in either layers 24 or layers 25.

Insulating layers 31 preferably contain a heat-resistant material. Separator 4, which is a microporous membrane made of a polymer resin, has the property of shrinking at a high temperature. In vehicle and other uses with a severe use environment, the shrinkage of separator 4 in addition to the heat generated during discharge may cause a short circuit between positive electrode 1 and negative electrode 3, and may even cause heat or smoke. However, the use of a heat-resistant material in insulating layers 31 is desirable in terms of safety because it can keep the insulation between positive electrode 1 and negative electrode 3 when separator 4 is shrunk. It is also possible to add low-melting-point resin beads to insulating layers 31 in order to provide the function of blocking the current at an abnormally high temperature. Alternatively, the resin beads may be formed into a layer and provided on each insulating layer 31. Insulating layers 31 can be formed by stirring a precursor solution containing a heat-resistant material in a double-arm kneader until the solution is kneaded into a paste, and then by applying the paste to positive electrode 1, negative electrode 3 or separator 4 by doctor blading or die coating and drying it.

The heat-resistant material used in insulating layers 31 is preferably a heat-resistant resin having a heat deflection temperature of 200° C. or higher. Specific examples of the heat-resistant material include polyimide, polyamide-imide, aramid, polyphenylene sulfide, polyetherimide, polyethylene terephthalate, polyethernitrile, polyetherketone, and polybenzimidazole. Of these, an aramid resin is most desirable because of its high heat deflection temperature.

Insulating layers 31 desirably also contain an insulating filler to increase the porosity, thereby improving the capacity to retain the electrolytic solution. This can also improve battery characteristics. It is particularly desirable to use as the main material an insulating filler whose particles are bonded to each other via a binder. Specific examples of the binder to bond the particles of the insulating filler include PTFE and modified acrylonitrile rubber particles, other than PVDF. In the case of using PTFE or modified acrylonitrile rubber particles, it is desirably combined with a viscosity improver such as carboxymethylcellulose (hereinafter, CMC), polyethylene oxide (PEO), or modified acrylonitrile rubber that has a viscosity different from the modified acrylonitrile rubber particles used as the binder. These resins have a high affinity for a non-aqueous electrolytic solution so that they absorb the solution and swell. This swelling allows insulating layers 31 to properly expand their volume, thereby improving the capacity to retain the non-aqueous electrolytic solution. As the insulating filler, resin beads, an inorganic oxide, or the like can be used and an inorganic oxide is desirable because of its high specific heat. Above all, alumina, titania, zirconia, and magnesia are particularly desirable because of their high specific heat, thermal conductivity, and thermal shock resistance. Although the insulating filler and the heat resistant resin can be used separately because of their heat resistance, they can alternatively be mixed or layered on top of each other.

Insulating layers 31 containing a heat-resistant material may be provided in both positive electrode 1 and negative electrode 3; however, it is preferably provided in either electrode 1 or 3 in order to reduce the number of production steps. In this case, insulating layers 31 are preferably provided on negative electrode 3 so as to improve the insulation between positive electrode 1 and negative electrode 3 because negative electrode 3 is larger in area than positive electrode 1.

One of insulating layers 31 containing a heat-resistant material is desirably supported on separator 4 because it can prevent separator 4 from being shrunk due to the heat generated during the welding of the current collectors to the electrode core sheets.

Figure 3:
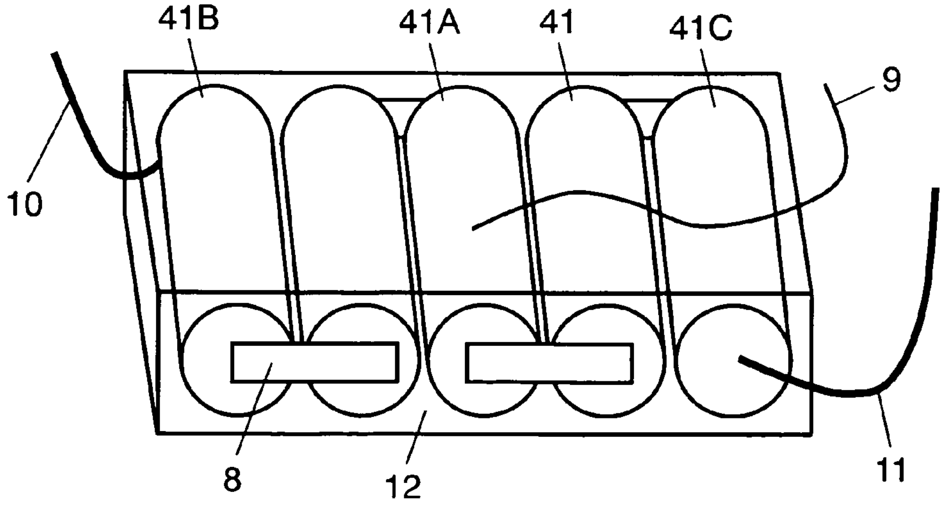
FIG. 3 is a schematic view of a battery pack using the non-aqueous electrolyte secondary battery in accordance with the embodiment of the present invention.

Using the non-aqueous electrolyte secondary battery thus structured, a battery pack described as follows with reference to FIG. 3 is formed. FIG. 3 is a perspective view of the battery pack. Five non-aqueous electrolyte secondary batteries (hereinafter, batteries) 41 are arranged in parallel at intervals of, for example, 1 mm using unillustrated isolating plates. Five batteries 41 are connected in series with each other by resistance-welding linkage plates 8 to the positive terminal of one of two adjacent batteries 41 and to the negative terminal of the other of the two adjacent batteries 41. The positive terminal of an outermost battery 41B is connected to the positive terminal 10, and the negative terminal of the other outermost battery 41C is connected to negative terminal 11. Linkage plates 8 can be made of Fe, Ni, Al, Ti, stainless steel, copper (Cu) or the like, and are desirably made of Al or Cu because of their low electrical resistance.

Battery 41A arranged in the center is equipped with temperature sensor 9 in order to measure the temperature during charge-discharge cycles. Temperature sensor 9 is formed of a thermocouple or the like and is attached on an insulating tube of battery 41A so as to be connected to an unillustrated controller. The controller may be designed to open the circuit between positive terminal 10 and negative terminal 11 when the output of temperature sensor 9 reaches a predetermined value (60° C., for example). This prevents the battery pack from increasing in temperature.

Five batteries 41, linkage plates 8, and temperature sensor 9 are covered with outer case 12 made of resin. Outer case 12 is made of a material having high heat resistance and high mechanical strength such as acrylonitrile-styrene-butadiene (ABS), polyethylene terephthalate (PET), and polypropylene (PP).

The following are specific examples of batteries to describe advantages of the present invention. Preparation of main components of Battery no. 1 as a first sample will be described first. In addition, the width "B" of inclined weight region 52 relative to the width (A+B) of positive-electrode mixture layer 24 will be determined as follows.

(1) Production of the Positive Electrode

As a positive active material, $Li_{1.0}Ni_{1/3}Mn_{1/3}Co_{1/3}O_2$ is used. To obtain this material, lithium carbonate ($Li_2CO_3$) is mixed, in a specific number of moles, with hydroxide consisting of nickel, manganese, and cobalt (an equimolar mixture of $Ni(OH)_2$, $Mn(OH)_2$, and $Co(OH)_2$) and then fired for 10 hours at 900° C. in air atmosphere.

The hydroxide consisting of nickel, manganese, and cobalt is synthesized by dissolving a predetermined amount of each of nickel nitrate, manganese nitrate, and cobalt nitrate together; adding sodium hydroxide thereto; washing the coprecipitate; and drying it at 150° C.

This positive active material is agitated to be mixed with acetylene black as a conductive material and N-methylpyrrolidone solution of polyvinylidene fluoride as a binder so as to obtain positive-electrode mixture paste. The positive active material, acetylene black, and polyvinylidene fluoride are mixed in a weight ratio of 100:3:5. Then, the positive-electrode mixture paste is applied to both surfaces of a 15 μm-thick aluminum foil which is used as positive electrode core sheet 22. An end portion of positive electrode core sheet 22 is formed as a non-coated portion having a width of 20 mm. This non-coated portion corresponds to core-exposed portion 2C. In Battery no. 1, the positive-electrode mixture paste is applied in such a manner that the width "B" of inclined weight region 52 can satisfy "B/(A+B)=0.1". The width "B" is determined by measuring the difference in the thickness of the applied and dried paste. The total width (A+B) to be coated is set to 50 mm and the width "B" is set to 5 mm.

The inclination of weight is achieved by adjusting the viscosity and coating speed of the paste. More specifically, the viscosity of the paste is adjusted to be in the range of 13000 to 16000 cPs at room temperature using a Brookfield viscometer, and the paste is coated 5 m to 15 m per minute. Later, the coated paste is dried and rolled by a rolling mill, and positive electrode core sheet 22 with the paste is cut in size so as to obtain positive electrode 1.

Then, the average mixture density on the end of the coated mixture, which is inclined weight region 52, is calculated from the thickness and weight of the mixture applied. The mixture density of constant weight region 51 having no inclination of weight is calculated in the same manner. In Battery no. 1, the mixture density ratio, which is the ratio of the average mixture density of inclined weight region 52 to the mixture density of constant weight region 51, is set at 70%.

(2) Production of the Negative Electrode

As a negative active material, scaly graphite is used which is pulverized and classified to have an average particle diameter of about 20 μm. The scaly graphite is mixed with styrene-butadiene rubber as the binder in a weight ratio of 100:3. The graphite mixed with the binder is added with a CMC aqueous solution in such a manner that CMC is 1% of the graphite, thereby obtaining negative-electrode mixture paste. The negative-electrode mixture paste is applied to both surfaces of a 10 μm-thick copper foil which is used as negative electrode core sheet 23. After dried, the paste is roll-pressed by a rolling mill, and negative electrode core sheet 23 with the paste is cut in a predetermined size. The negative electrode mixture is partly removed in the direction perpendicular to the winding direction, and the removed portion is ultrasonic welded with nickel current collector 61A shown in FIG. 2. As a result, the negative electrode is complete.

(3) Preparation of the Non-Aqueous Electrolytic Solution

As a solvent, a mixture of EC and ethyl methyl carbonate is used in a volume ratio of 30:70 at 40° C. $LiPF_6$ is dissolved at 1.0 mol/L in this solvent. This is the completion of the non-aqueous electrolytic solution.

With the aforementioned components, the non-aqueous electrolyte secondary battery is prepared as follows. Positive electrode 1 and negative electrode 3 are wound together via polyethylene separator 4 therebetween to form electrode assembly 5 shown in FIG. 2B. The end of the negative-electrode mixture layer is provided to protrude as long as 2 mm from the end of the positive-electrode mixture layer. Later, current collector 6C is collectively welded to the wound parts of core-exposed portion 2C formed in positive electrode 1. Then, electrode assembly 5 is housed in battery can 7; current collector 6C is connected to an unillustrated lid; and current collector 61A is connected to battery can 7. Finally, battery can 7 is filled with the non-aqueous electrolytic solution and sealed with the lid, thereby completing the non-aqueous electrolyte secondary battery as Battery no. 1. Battery no. 1 is 18 mm in diameter and 65 mm in height.

Battery no. 2 is prepared in the same manner as Battery no. 1 except that while the width (A+B) of positive-electrode mixture layer 24 is 50 mm, the width "B" of inclined weight region 52 is set to 10 mm. More specifically, the positive-electrode mixture paste is applied so as to satisfy "B/(A+B)=0.2" by adjusting the viscosity of the paste to the range of 9000 to 12000 cPs at room temperature. In the following description, Battery no. 2 will be used as a typical example.

Battery no. 3 is prepared in the same manner as Battery no. 1 except that while the width (A+B) of positive-electrode mixture layer 24 is 50 mm, the width "B" of inclined weight region 52 is set to 15 mm. More specifically, the positive-electrode mixture paste is applied so as to satisfy "B/(A+B)=0.3" by adjusting the viscosity of the paste to the range of 5000 to 8000 cPs at room temperature. Specifications of Batteries no. 1 to 3 are shown in Table 1 as below.

TABLE 1

| | Positive electrode | | Negative electrode | | |
|---|---|---|---|---|---|
| Battery no. | Width ratio B/(A + B) | Mixture density ratio (%) | Width ratio B/(A + B) | Mixture density ratio (%) | Separator or insulating layer |
| 1 | 0.1 | 70 | no core-exposed portion | | polyethylene |
| 2 | 0.2 | 70 | no core-exposed portion | | polyethylene |
| 3 | 0.3 | 70 | no core-exposed portion | | Polyethylene |

Using five cells of each of these non-aqueous electrolyte secondary batteries, non-aqueous electrolyte secondary battery packs as shown in FIG. 3 are produced and evaluated by the following tests.

Measurement of Discharge Capacity

Each battery pack is charged and discharged at 25° C. Charging is performed at a constant current of 2 A until each battery reaches 4.2V and then at a constant voltage of 4.2V. The charging is completed when the charge current goes down to 200 mA. On the other hand, discharging is performed at a constant current of 10 A until each battery reaches 2.5V. The charging and discharging have a rest period of 20 minutes between them. The charging and discharging operations excluding the current values and the rest period are controlled by a controller which is installed in the battery pack and has a function of equalizing the state of charge between the batteries in the battery pack.

Observation of Lithium Deposition After Low-Temperature Cycle Test

In order to examine whether or not the accepting load of lithium ion by the negative electrode exceeds the load design value depending on the difference in density on the end portion of positive electrode 1, each battery pack is charged and discharged for 200 cycles at 0° C. Charging is performed at a constant current of 2 A until each battery reaches 4.25V and then at a constant voltage of 4.25V. The charging is completed when the charge current goes down to 200 mA. On the other hand, discharging is performed at a constant current of 10 A until each battery reaches 2.5V. The charging and discharging have a rest period of 20 minutes between them. After 200 cycles, battery 41A in the center of the battery pack shown in FIG. 3 is decomposed while it is in a charged state to examine the deposition of metallic lithium in the portion of the negative electrode that is opposed to the end portion of positive electrode 1.

Vibration Test

Each battery pack is subjected to a 10-hour vibration test using a pulse width of 50 Hz at 20 G. The difference in open circuit voltage (OCV) between before and after the test is measured.

Storage Test

Each battery pack is charged and discharged at 25° C. at first. Charging is performed at a constant current of 2 A until each battery reaches 4.2V and then at a constant voltage of 4.2V. The charging is completed when the charge current goes down to 200 mA. On the other hand, discharging is performed at a constant current of 10 A until each battery reaches 2.5V. The charging and discharging have a rest period of 20 minutes between them. After the discharging, battery packs are stored for three days at 80° C. Other battery packs are stored for six hours at 100° C. After the respective storage periods, each one cell in the battery packs is decomposed to determine the maximum shrinkage of the separator.

Results of these tests are shown in Table 2 as below.

TABLE 2

| Buttery no. | Discharge capacity (Ah) | Lithium deposition in cycle test | OCV decrease in vibration test (V) | Shrinkage after 3 days at 80° C. (%) | Shrinkage after 6 hours at 100° C. (%) |
|---|---|---|---|---|---|
| 1 | 1.61 | no | 0.000 | 0 | 4.5 |
| 2 | 1.48 | no | 0.001 | 0 | 4.5 |
| 3 | 1.23 | no | 0.001 | 0 | 4.6 |

Table 2 shows that when the value of B/(A+B), which is the ratio of the width of inclined weight region 52 to the width of positive-electrode mixture layer 24, exceeds 0.2, increase of the width "B" causes reduction in the weight of positive-electrode mixture layer 24, thereby greatly decreasing the discharge capacity. However, Batteries no. 1 to 3 have similar estimation results in the other aspects, and therefore the value of B/(A+B) is desirably not more than 0.2.

The following is a description of the ratio of the average mixture density of inclined weight region 52 to the mixture density of constant weight region 51 after the mixture is roll-pressed.

Battery no. 4 is prepared in the same manner as Battery no. 1 except that positive-electrode mixture layers 24 are provided at their end portions at the same side with an organic-solvent-resistant foamed material so as to increase the thickness of the mixture to be applied to the end portions. More specifically, inclined weight region 52 is not provided, and instead the portion corresponding to inclined weight region 52 is designed to have a mixture density of 105% of the mixture density of constant weight region 51 after the mixture is roll-pressed.

Batteries no. 5, 6, and 7 are prepared in the same manner as Battery no. 2 except that the mixture is roll-pressed with different roller gaps between constant weight region 51 and inclined weight region 52. As a result, the ratio of the average mixture density of inclined weight region 52 to the mixture density of constant weight region 51 after the roll-pressing of the mixture is 99%, 40%, and 30% in Batteries no. 5, 6, and 7, respectively.

Specifications of Batteries no. 2 and 4 to 7 are shown in Table 3.

TABLE 3

| | Positive electrode | | Negative electrode | | |
|---|---|---|---|---|---|
| Battery no. | Width ratio B/(A + B) | Mixture density ratio (%) | Width ratio B/(A + B) | Mixture density ratio (%) | Separator or insulating layer |
| 4 | 0 | 105 | no core-exposed portion | | polyethylene |
| 5 | 0.2 | 99 | no core-exposed portion | | polyethylene |
| 2 | 0.2 | 70 | no core-exposed portion | | polyethylene |
| 6 | 0.2 | 40 | no core-exposed portion | | polyethylene |
| 7 | 0.2 | 30 | no core-exposed portion | | polyethylene |

Battery packs prepared using Batteries no. 4 to 7 are estimated in the same manner as Batteries no. 1 to 3 above. The test results of Batteries no. 4 to 7 are shown in Table 4 as below together with the test results of Battery no. 2.

TABLE 4

| Battery no. | Discharge capacity (Ah) | Lithium deposition in cycle test | OCV decrease in vibration test (V) | Shrinkage after 3 days at 80° C. (%) | Shrinkage after 6 hours at 100° C. (%) |
|---|---|---|---|---|---|
| 4 | 1.48 | deposited | 0.000 | 0 | 4.0 |
| 5 | 1.48 | No | 0.000 | 0 | 4.0 |
| 2 | 1.48 | No | 0.001 | 0 | 4.5 |
| 6 | 1.49 | No | 0.001 | 0 | 4.5 |
| 7 | 1.48 | no | 0.023 | 0 | 4.7 |

In Battery no. 4 in which positive electrode 1 has the increased mixture density at its end portions, a larger load is applied to negative electrode 3. As shown in Table 4, when Battery no. 4 is decomposed and observed after being subjected to the test in long-term and low-temperature environments, it is confirmed that the accepting load of lithium ion by the negative electrode exceeds the load design value. This may cause a short circuit between electrodes 1 and 3, which may even cause trouble such as heat or smoke.

On the other hand, when the mixture density ratio is less than 40% as in Battery no. 7, the vibration test shows a decrease in the OCV. Batteries having a reduced OCV are decomposed to find that positive-electrode mixture layers 24 are partly released or suspended. The cause of this seems to be that the decreased mixture density reduces the adhesion between positive electrode core sheet 22 and positive-electrode mixture layers 24. As a result, the mixture density ratio is desirably not less than 40% and not more than 99%.

The following is a description of materials of insulating layers 31 when insulating layers 31 are provided in positive electrode 1 and separator 4 is not provided. Batteries no. 8 to 12 are prepared in the same manner as Battery no. 2 except that positive electrode 1 is provided with 20 μm-thick insulating layers 31, which are made of an aramid resin, an alumina porous material, a titania porous material, a zirconia porous material, and a magnesia porous material, respectively. Specifications of Batteries no. 2 and no. 8 to 12 are shown in Table 5 below.

TABLE 5

| | Positive electrode | | Negative electrode | | |
|---|---|---|---|---|---|
| Battery no. | Width ratio B/(A + B) | Mixture density ratio (%) | Width ratio B/(A + B) | Mixture density ratio (%) | Separator or insulating layer |
| 2 | 0.2 | 70 | no core-exposed portion | | polyethylene |
| 8 | 0.2 | 70 | no core-exposed portion | | aramid resin |
| 9 | 0.2 | 70 | no core-exposed portion | | alumina |
| 10 | 0.2 | 70 | no core-exposed portion | | titania |
| 11 | 0.2 | 70 | no core-exposed portion | | zirconia |
| 12 | 0.2 | 70 | no core-exposed portion | | magnesia |

Battery packs prepared using the battery examples are estimated in the same manner as described above. The test results are shown in Table 6 as below together with the test results of Battery no. 2.

TABLE 6

| Battery no. | Discharge capacity (Ah) | Lithium deposition in cycle test | OCV decrease in vibration test (V) | Shrinkage after 3 days at 80° C. (%) | Shrinkage after 6 hours at 100° C. (%) |
|---|---|---|---|---|---|
| 2 | 1.48 | no | 0.001 | 0 | 4.5 |
| 8 | 1.48 | no | 0.000 | 0 | 0.2 |
| 9 | 1.48 | no | 0.000 | 0 | 0 |
| 10 | 1.48 | no | 0.001 | 0 | 0 |
| 11 | 1.48 | no | 0.001 | 0 | 0 |
| 12 | 1.49 | no | 0.000 | 0 | 0 |

As shown in Table 6, both separator 4 made of polyethylene and insulating layers 31 made of a heat-resistant material have excellent results with similar shrinkage at 80° C. On the other hand, at 100° C., the batteries using insulating layers 31 have higher insulation reliability. This means that the provision of insulating layers 31 made of a heat-resistant material can further improve battery safety.

Batteries no. 1 to 12 described hereinbefore have core-exposed portion 2C on the positive electrode only. The following is a description of battery examples having core-exposed portion 2A on the negative electrode only.

(4) Production of the Positive Electrode

The same positive-electrode mixture paste as used in Battery no. 1 is applied to both surfaces of a 15 μm-thick aluminum foil, which is used as the positive electrode core. After being dried, the paste is roll-pressed by a rolling mill and positive electrode core sheet with the paste is cut in size. The positive electrode mixture is partly removed in the direction perpendicular to the winding direction, and the removed portion is ultrasonic welded with a ribbon-like current collector made of Al. As a result, the positive electrode 1 is complete.

(5) Production of the Negative Electrode

The same negative-electrode mixture paste as used in Battery no. 1 is applied to both surfaces of a 10 μm-thick copper foil, which is used as negative electrode core sheet 23. A non-coated portion having a width of 20 mm is formed at the end of negative electrode core sheet 23. This non-coated portion corresponds to core-exposed portion 2A. In Battery no. 13, the negative-electrode mixture paste is applied in such a manner that the width "B" of inclined weight region 54 can satisfy "B/(A+B)=0.1". The total width (A+B) to be coated is set to 54 mm and the width "B" is set to 5.4 mm. After dried, the paste is roll-pressed by a rolling mill, and negative electrode core sheet 23 with the paste is cut in size so as to obtain negative electrode 3. The ratio of the mixture density of the non-coated portion, which is inclined weight region 54 to the mixture density of constant weight region 53 is set at 70%.

The non-aqueous electrolyte secondary battery as Battery no. 13 will be prepared as follows. The positive electrode and negative electrode 3 thus obtained are wound together with polyethylene separator 4 therebetween to form an electrode assembly. The end of the negative-electrode mixture layer is provided to protrude as long as 2 mm from the end of the positive-electrode mixture layer. Later, current collector 6A is collectively welded to the wound parts of core-exposed portion 2A formed in negative electrode 3. The electrode assembly is housed in battery can 7; current collector 6C of the positive electrode is connected to an unillustrated lid; and current collector 6A is connected to battery can 7. Finally, battery can 7 is filled with the non-aqueous electrolytic solution as described previously and sealed with the lid, thereby completing the non-aqueous electrolyte secondary battery as Battery no. 13.

Battery no. 14 is prepared in the same manner as Battery no. 13 except that the width (A+B) of negative-electrode mixture layer 25 is set to 54 mm and the width "B" is set to 10.8 mm. More specifically, the negative-electrode mixture paste is applied so as to satisfy "B/(A+B)=0.2". In the following description, Battery no. 14 will be used as a typical example.

Battery no. 15 is prepared in the same manner as Battery no. 13 except that while the width (A+B) of negative-electrode mixture layer 25 is 54 mm, the width "B" is set to 16.2 mm. More specifically, the negative-electrode mixture paste is applied so as to satisfy "B/(A+B)=0.3". Specifications of Batteries no. 13 to 15 are shown in Table 7 as below.

TABLE 7

| | Positive electrode | | Negative electrode | | |
|---|---|---|---|---|---|
| Battery no. | Width ratio B/(A + B) | Mixture density ratio (%) | Width ratio B/(A + B) | Mixture density ratio (%) | Separator or insulating layer |
| 13 | no core-exposed portion | | 0.1 | 70 | polyethylene |
| 14 | no core-exposed portion | | 0.2 | 70 | polyethylene |
| 15 | no core-exposed portion | | 0.3 | 70 | polyethylene |

Battery packs prepared using the battery examples are estimated in the same manner as described above. The test results are shown in Table 8 as below.

TABLE 8

| Battery no. | Discharge capacity (Ah) | Lithium deposition in cycle test | OCV decrease in vibration test (V) | Shrinkage after 3 days at 80° C. (%) | Shrinkage after 6 hours at 100° C. (%) |
|---|---|---|---|---|---|
| 13 | 1.48 | No | 0.000 | 0 | 4.5 |
| 14 | 1.48 | no | 0.000 | 0 | 4.5 |
| 15 | 1.48 | deposited | 0.000 | 0 | 4.6 |

In case that the positive active material of a just completed battery contains lithium ions, the battery capacity is determined by the weight of positive-electrode mixture layers 24. Therefore, as shown in Table 8, a change in the width of inclined weight region 54 of negative electrode 3 does not affect the discharge capacity. However, when negative electrode 3 has core-exposed portion 2A, if B/(A+B) exceeds 0.2 as in Battery no. 15, negative electrode 3 cannot store all the lithium ions from the opposed positive electrode. This causes the deposition of metallic lithium as a result that the amount of the negative electrode mixture to be applied is decreased as the width "B" is increased. Although this phenomenon can be avoided by making positive-electrode mixture layers 24 smaller in width than negative-electrode mixture layers 25, this results in decrease in the battery capacity. To prevent the decrease, the value of B/(A+B) is desirably not more than 0.2.

The following is a description of the ratio of the average mixture density of inclined weight region 54 to the mixture density of constant weight region 53 after the mixture is roll-pressed.

Battery no. 16 is prepared in the same manner as Battery no. 14 except that negative-electrode mixture layers 25 are provided at their end portions at the same side with an organic-solvent-resistant foamed material so as to increase the thickness of the mixture to be applied to the end portions. More specifically, inclined weight region 54 is not provided, and instead the portion corresponding to inclined weight region 54 is designed to have a mixture density of 105% of the mixture density of constant weight region 53 after the mixture is roll-pressed.

Batteries no. 17 to 19 are prepared in the same manner as Battery no. 14 except that the ratio of the average mixture density of inclined weight region 54 to the mixture density of constant weight region 53 after the mixture is roll-pressed is 99%, 40%, and 30%, respectively. Specifications of Batteries no. 14 and no. 16 to 19 are shown in Table 9 as below.

TABLE 9

| Battery no. | Positive electrode Width ratio B/(A + B) | Positive electrode Mixture density ratio (%) | Negative electrode Width ratio B/(A + B) | Negative electrode Mixture density ratio (%) | Separator or insulating layer |
|---|---|---|---|---|---|
| 16 | no core-exposed portion | | 0 | 105 | polyethylene |
| 17 | no core-exposed portion | | 0.2 | 99 | polyethylene |
| 14 | no core-exposed portion | | 0.2 | 70 | polyethylene |
| 18 | no core-exposed portion | | 0.2 | 40 | polyethylene |
| 19 | no core-exposed portion | | 0.2 | 30 | polyethylene |

Battery packs prepared using the battery examples are estimated in the same manner as described above. The test results are shown in Table 10 as below together with the test results of Battery no. 14.

TABLE 10

| Battery no. | Discharge capacity (Ah) | Lithium deposition in cycle test | OCV decrease in vibration test (V) | Shrinkage after 3 days at 80° C. (%) | Shrinkage after 6 hours at 100° C. (%) |
|---|---|---|---|---|---|
| 16 | 1.48 | deposited | 0.000 | 0 | 4.1 |
| 17 | 1.48 | — | 0.000 | 0 | 4.2 |
| 14 | 1.48 | — | 0.000 | 0 | 4.5 |
| 18 | 1.48 | — | 0.001 | 0 | 4.5 |
| 19 | 1.48 | deposited | 0.021 | 0 | 4.8 |

As in Battery no. 16, an increase in the mixture density of the negative electrode 3 causes negative electrode 3 to have a lower performance to accept lithium ions under these experimental conditions. Consequently, deposition of metallic lithium is observed in the region of negative electrode 3 where the mixture density is large. On the other hand, in Battery no. 19 having a mixture density ratio as low as 30% as in Battery no. 7, the mixture falls off negative electrode 3 when subjected to vibration. Therefore, the mixture density ratio is desirably not less than 40% and not more than 99%.

The following is a description of materials of insulating layers 31 when insulating layers 31 are provided in negative electrode 3, and separator 4 is not provided. Batteries no. 20 to 24 are prepared in the same manner as Battery no. 14 except that negative electrode 3 is provided with 20 μm-thick insulating layers 31, which are made of an aramid resin, an alumina porous material, a titania porous material, a zirconia material, and a magnesia porous material, respectively. Specifications of Batteries no. 14 and no. 20 to 24 are shown in Table 11 as below.

TABLE 11

| Battery no. | Positive electrode Width ratio B/(A + B) | Positive electrode Mixture density ratio (%) | Negative electrode Width ratio B/(A + B) | Negative electrode Mixture density ratio (%) | Separator or insulating layer |
|---|---|---|---|---|---|
| 14 | no core-exposed portion | | 0.2 | 70 | polyethylene |
| 20 | no core-exposed portion | | 0.2 | 70 | aramid resin |
| 21 | no core-exposed portion | | 0.2 | 70 | alumina |
| 22 | no core-exposed portion | | 0.2 | 70 | titania |
| 23 | no core-exposed portion | | 0.2 | 70 | zirconia |
| 24 | no core-exposed portion | | 0.2 | 70 | magnesia |

Battery packs prepared using the battery examples are estimated in the same manner as described above. The test results are shown in Table 12 as below together with the test results of Battery no. 14.

TABLE 12

| Battery no. | Discharge capacity (Ah) | Lithium deposition in cycle test | OCV decrease in vibration test (V) | Shrinkage after 3 days at 80° C. (%) | Shrinkage after 6 hours at 100° C. (%) |
|---|---|---|---|---|---|
| 14 | 1.48 | no | 0.000 | 0 | 4.5 |
| 20 | 1.48 | no | 0.001 | 0 | 0.2 |
| 21 | 1.48 | no | 0.001 | 0 | 0 |
| 22 | 1.49 | no | 0.002 | 0 | 0 |
| 23 | 1.49 | no | 0.002 | 0 | 0 |
| 24 | 1.49 | no | 0.001 | 0 | 0 |

As shown in Table 12, the battery examples having insulating layers 31 on negative electrode 3 show similar results as the battery example having insulating layers 31 on positive electrode 1 shown in Table 6. In other words, insulating layers 31 made of a heat-resistant material do not shrink even at 100° C.

As described above, Batteries no. 1 to 12 have core-exposed portion 2C in the positive electrode only, and Batteries no. 13 to 24 have core-exposed portion 2A in the negative electrode only. The following is a description of battery examples having the core-exposed portions in both the positive and negative electrodes as shown in FIG. 2A.

In Battery no. 25, electrode assembly 5 is formed using the positive electrode of Battery no. 2 and the negative electrode of Battery no. 14. The end of the negative-electrode mixture layer is provided so as to protrude as long as 2 mm from the end of positive-electrode mixture layer. Later, current collector 6A is collectively welded to the wound parts of core-exposed portion 2A formed in negative electrode 3, and current collector 6C is collectively welded to the wound parts of core-exposed portion 2C formed in positive electrode 1. Electrode assembly 5 is housed in battery can 7; current collector 6C is connected to an unillustrated lid; and current collector 6A is connected to battery can 7. Finally, battery can 7 is filled with the non-aqueous electrolytic solution and sealed with the lid, thereby completing the non-aqueous electrolyte secondary battery as Battery no. 25.

Battery no. 26 is prepared in the same manner as Battery no. 25 except for using the positive electrode of Battery no. 3 and the negative electrode of Battery no. 14. Battery no. 27 is formed in the same manner as Battery no. 25 except for using the positive electrode of Battery no. 2 and the negative electrode of Battery no. 15.

Batteries no. 28 to 31 are prepared in the same manner as Battery no. 25 except for using the negative electrode of Battery no. 14 and the positive electrodes of Batteries no. 4 to 7, respectively. Batteries no. 32 to 35 are prepared in the same manner as Battery no. 25 except for using the positive electrode of Battery no. 2 and the negative electrodes of Batteries no. 16 to 19, respectively.

Batteries no. 36 to 40 are prepared in the same manner as Battery no. 25 except that separator 4 is not provided and that the same insulating layers 31 as in Batteries no. 8 to 12 are provided on positive electrode 1. Specifications and test results of the battery examples are shown in Table 13 and Table 14, respectively.

TABLE 13

| | Positive electrode | | Negative electrode | | |
|---|---|---|---|---|---|
| Battery no. | Width ratio B/(A + B) | Mixture density ratio (%) | Width ratio B/(A + B) | Mixture density ratio (%) | Separator or insulating layer |
| 25 | 0.2 | 70 | 0.2 | 70 | polyethylene |
| 26 | 0.3 | 70 | 0.2 | 70 | polyethylene |
| 27 | 0.2 | 70 | 0.3 | 70 | polyethylene |
| 28 | 0 | 105 | 0.2 | 70 | polyethylene |
| 29 | 0.2 | 99 | 0.2 | 70 | polyethylene |
| 30 | 0.2 | 40 | 0.2 | 70 | polyethylene |
| 31 | 0.2 | 30 | 0.2 | 70 | polyethylene |
| 32 | 0.2 | 70 | 0 | 105 | polyethylene |
| 33 | 0.2 | 70 | 0.2 | 99 | polyethylene |
| 34 | 0.2 | 70 | 0.2 | 40 | polyethylene |
| 35 | 0.2 | 70 | 0.2 | 30 | polyethylene |
| 36 | 0.2 | 70 | 0.2 | 70 | aramid resin |
| 37 | 0.2 | 70 | 0.2 | 70 | alumina |
| 38 | 0.2 | 70 | 0.2 | 70 | titania |
| 39 | 0.2 | 70 | 0.2 | 70 | zirconia |
| 40 | 0.2 | 70 | 0.2 | 70 | magnesia |

TABLE 14

| Battery no. | Discharge capacity (Ah) | Lithium deposition in cycle test | OCV decrease in vibration test (V) | Shrinkage after 3 days at 80° C. (%) | Shrinkage after 6 hours at 100° C. (%) |
|---|---|---|---|---|---|
| 25 | 1.48 | deposited | 0.000 | 0 | 4.6 |
| 26 | 1.25 | no | 0.000 | 0 | 4.6 |
| 27 | 1.49 | no | 0.000 | 0 | 4.7 |
| 28 | 1.48 | no | 0.000 | 0 | 4.2 |
| 29 | 1.49 | no | 0.000 | 0 | 4.2 |
| 30 | 1.48 | no | 0.002 | 0 | 4.4 |
| 31 | 1.48 | no | 0.025 | 0 | 4.9 |
| 32 | 1.48 | deposited | 0.000 | 0 | 4.3 |
| 33 | 1.48 | no | 0.000 | 0 | 4.3 |
| 34 | 1.49 | no | 0.001 | 0 | 4.7 |
| 35 | 1.49 | deposited | 0.022 | 0 | 5.1 |
| 36 | 1.48 | no | 0.001 | 0 | 0.1 |
| 37 | 1.49 | no | 0.002 | 0 | 0.0 |
| 38 | 1.48 | no | 0.002 | 0 | 0.0 |
| 39 | 1.49 | no | 0.003 | 0 | 0.0 |
| 40 | 1.48 | no | 0.002 | 0 | 0.0 |

As shown in Table 14, Batteries no. 25 to 40 having the core-exposed portions in both of the positive and negative electrodes cause phenomena similar to Batteries no. 1 to 24 having the core-exposed portion in either the positive or negative electrode, and solve the problems in a similar manner.

As described hereinbefore, the non-aqueous electrolyte secondary battery of the present invention can be manufactured at low cost by eliminating the process of removing the mixture layers and reducing the number of expendable supplies. The battery can also have high safety and high cycle life characteristics by reducing the weight of the positive electrode near the end portion of the coated mixture so as to reduce the design load of the opposing negative electrode. In addition, the non-aqueous electrolyte secondary battery and the battery pack can achieve high safety and high output levels by using a heat-resistant resin which reduces separator shrinkage and by disposing heat-resistant porous insulating layers between the electrodes so as to avoid a short circuit in case the separator shrinks. The non-aqueous electrolyte secondary battery and battery pack are useful as the power supply for electric tools, power-assisted bicycles, electric scooters, robots, and the like.

What is claimed is:

1. A non-aqueous electrolyte secondary battery comprising:

an electrode assembly including:

a first electrode having a first electrode core sheet and first-electrode mixture layers formed by first-electrode mixture including a first active material, each of the first-electrode mixture layers being formed on both sides of the first electrode core sheet;

a second electrode having a second electrode core sheet and second-electrode mixture layers formed by second-electrode mixture including a second active material, each of the second-electrode mixture layers being formed on both sides of the second electrode core sheet; and an insulating layer electrically insulating the first electrode and the second electrode and permeating lithium ions, the electrode assembly being formed by winding the first electrode, the second electrode and the insulating layer together along a winding axis; and a non-aqueous electrolyte disposed between the first electrode and the second electrode, wherein the first electrode includes a first core-exposed portion disposed at an edge of the first electrode core sheet and disposed perpendicular to the winding axis, the first electrode core sheet being exposed at the first core-exposed portion; and wherein at least one of the first-electrode mixture layers includes:

a first inclined weight region in which a density of the first-electrode mixture decreases toward the first core-exposed portion, and a first constant weight region which is adjacent to the first inclined weight region and in which the density of the first-electrode mixture is constant.

2. The non-aqueous electrolyte secondary battery according to claim 1, wherein the first inclined weight region has a width, in a direction parallel to the winding axis, of not more than 20% of a width, in a direction parallel to the winding axis, of the first-electrode mixture layers and the average density of the first-electrode mixture of not less than 40% and not more than 99% of a density of the first-electrode mixture in the first constant weight region.

3. The non-aqueous electrolyte secondary battery according to claim 1, wherein the second electrode includes a second core-exposed portion disposed at an edge of the second electrode core sheet and perpendicular to the winding axis, the second electrode core sheet exposed at the second core-exposed portion; and wherein at least one of the second-electrode mixture layers includes:

a second inclined weight region in which a density of the second-electrode mixture decreases toward the second core-exposed portion, and a second constant weight region which is adjacent o the second inclined weight region and in which the density of the second-electrode mixture is constant.

4. The non-aqueous electrolyte secondary battery according to claim 3, wherein the second inclined weight region has a width, in a direction parallel to the winding axis, of not more than 20% of a width, in a direction parallel to the winding axis, of the second-electrode mixture layers and the average density of the second-electrode mixture of not less than 40% and not more than 99% of a density of the second-electrode mixture in the second constant weight region.

5. The non-aqueous electrolyte secondary battery according to claim 1, wherein the first electrode is a positive electrode and the second electrode is a negative electrode.

6. The non-aqueous electrolyte secondary battery according to claim 1, wherein the first electrode is a negative electrode and the second electrode is a positive electrode.

7. The non-aqueous electrolyte secondary battery according to claim 3, wherein the first electrode is a positive electrode and the second electrode is a negative electrode.

8. The non-aqueous electrolyte secondary battery according to claim 1, wherein the insulating layer contains a heat-resistant resin having a heat deflection temperature of not less than 200° C.

9. The non-aqueous electrolyte secondary battery according to claim 8, wherein the heat-resistant resin is an aramid resin.

10. The non-aqueous electrolyte secondary battery according to claim 1, wherein the insulating layer contains insulating filler.

11. The non-aqueous electrolyte secondary battery according to claim 10, wherein the insulating filler is an inorganic oxide.

12. The non-aqueous electrolyte secondary battery according to claim 1, wherein the insulating layer is one of layers formed on at least ones of the first-electrode mixture layers and the second-electrode mixture layers.

13. The non-aqueous electrolyte secondary battery according to claim 1, further comprising a separator disposed between the first electrode and the second electrode.

14. The non-aqueous electrolyte secondary battery according to claim 13, wherein the insulating layer is formed on the separator.

15. A battery pack comprising:

a non-aqueous electrolyte secondary battery; and an outer case for covering the non-aqueous electrolyte secondary battery, wherein the non-aqueous electrolyte secondary battery having:

an electrode assembly including:

a first electrode having a first electrode core sheet and first-electrode mixture layers formed by first-electrode mixture including a first active material, each of the first-electrode mixture layers being formed on both sides of the first electrode core sheet;

a second electrode having a second electrode core sheet and second-electrode mixture layers formed by second-electrode mixture including a second active material, each of the second-electrode mixture layers being formed on both sides of the second electrode core sheet; and an insulating layer electrically insulating the first electrode and the second electrode and permeating lithium ions, the electrode assembly being formed by winding the first electrode, the second electrode and the insulating layer together along a winding axis; and a non-aqueous electrolyte disposed between the first electrode and the second electrode, wherein the first electrode includes a first core-exposed portion disposed at an edge of the first electrode core sheet and disposed perpendicular to the winding axis, the first electrode core sheet being exposed at the first core-exposed portion; and wherein at least one of the first-electrode mixture layers includes:

a first inclined weight region in which a density of the first-electrode mixture decreases toward the first core-exposed portion, and a first constant weight region which is adjacent to the first inclined weight region and in which the density of the first-electrode mixture is constant.

* * * * *